(12) United States Patent
Chen et al.

(10) Patent No.: US 12,515,703 B2
(45) Date of Patent: Jan. 6, 2026

(54) SYSTEMS AND METHODS FOR SAFETY-GUARANTEED DRIVING CONTROL OF AUTOMATED VEHICLES VIA INTEGRATED CLFS AND CDBFS

(71) Applicants: Yan Chen, Chandler, AZ (US); Yiwen Huang, Guangdong (CN)

(72) Inventors: Yan Chen, Chandler, AZ (US); Yiwen Huang, Guangdong (CN)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 142 days.

(21) Appl. No.: 18/242,240

(22) Filed: Sep. 5, 2023

(65) Prior Publication Data

US 2024/0075955 A1    Mar. 7, 2024

Related U.S. Application Data

(60) Provisional application No. 63/374,483, filed on Sep. 2, 2022.

(51) Int. Cl.
*B60W 60/00* (2020.01)

(52) U.S. Cl.
CPC ..... *B60W 60/0015* (2020.02); *B60W 2520/06* (2013.01); *B60W 2520/14* (2013.01); *B60W 2552/53* (2020.02)

(58) Field of Classification Search
CPC ........... B60W 60/0015; B60W 60/001; B60W 2520/06; B60W 2520/12; B60W 2520/125; B60W 2520/14; B60W 2552/53; B60W 30/095; B60W 30/0953; B60W 30/0956; B60W 30/12; B60W 30/02; B60W 2710/207; B60W 2720/12; B60W 2720/125; B60W 2720/14; B60W 2720/24

See application file for complete search history.

(56) References Cited

U.S. PATENT DOCUMENTS

| 11,235,764 | B2 * | 2/2022 | Bogner | G08G 1/167 |
| 11,830,258 | B2 * | 11/2023 | Campanale | G06V 20/588 |
| 2011/0098922 | A1 * | 4/2011 | Ibrahim | B60W 40/08 |
| | | | | 701/532 |

(Continued)

FOREIGN PATENT DOCUMENTS

CN    109017759 A  * 12/2018    ............ B60W 30/02

OTHER PUBLICATIONS

Huang et al., "Stability Control of Autonomous Ground Vehicles Using Control-Dependent Barrier Functions", Feb. 9, 2021, IEEE, vol. 6 No. 4, pp. 699-710 (Year: 2021).*

(Continued)

*Primary Examiner* — Erin M Piateski
*Assistant Examiner* — Ashley Tiffany Schoech
(74) *Attorney, Agent, or Firm* — Polsinelli PC

(57) ABSTRACT

A safety-guaranteed control system for automated vehicles (AVs) considers both vehicle and tire stabilities on varying road conditions. Conventional AV control systems may not be sufficient to adequately handle control-dependent and time-varying safety constraints. The system integrates control-dependent barrier functions (CDBF) and time-varying CBFs (TCBFs) with control Lyapunov functions (CLFs) in a quadratic programming problem.

16 Claims, 12 Drawing Sheets

(56) References Cited

U.S. PATENT DOCUMENTS

2021/0269038 A1* 9/2021 Lu .................. G08G 1/167

OTHER PUBLICATIONS

Khan et al., "Robust Control Framework for Lateral Dynamics of Autonomous Vehicle Using Barrier Lyapunov Function", Mar. 24, 2021, IEEE Access, vol. 9, pp. 50513-50522 (Year: 2021).*
Sergey et al., "On the Stability and Control of Nonlinear Dynamical Systems via Vector Lyapunov Functions", Feb. 2006, IEEE Transactions on Automatic Control, vol. 51 No. 2, pp. 203-215 (Year: 2006).*
Xiao et al., "Control Barrier Functions for Systems with High Relative Degree", Dec. 11-13, 2019, IEEE, 58th CDC, pp. 474-479 (Year: 2019).*
Ames, A. D., Galloway, K., Grizzle, J. W., and Sreenath, K. (2014). Rapidly exponentially stabilizing control Lyapunov functions and hybrid zero dynamics. IEEE Transactions on Automatic Control, vol. 59, No. 4, pp. 876-891.
Ames, A. D., Xu, X., Grizzle, J. W., and Tabuada, P. (2017). Control barrier function based quadratic programs for safety critical systems, IEEE Transactions on Automatic Control, vol. 62, No. 8, pp. 3861-3876.
Bansal, P., and Kockelman, K. M. (2017). Forecasting Americans' long-term adoption of connected and autonomous vehicle technologies. Transportation Research Part A, vol. 95, pp. 49-63.
Bloch, A. M., Reyhanoglu, M., and McClarmroch, N. H. (1992). Control and stabilization of nonholonomic dynamic systems. IEEE Transactions on Automatic Control, vol. 37, No. 11, pp. 1746-1757.
Wu, G. and Sreenath, K. (2015). Safety-critical and constrained geometric control synthesis using control Lyapunov and control Barrier functions for systems evolving on manifolds. in Proceedings of American Control Conference, pp. 2038-2044.
Goldstein, H. (2004) Classical mechanics 3rd, Chapter 1.3 Constraints, Pearson India: Addison-Wesley.
Koh, K. C. and Cho, H. S. (1999). A smooth path tracking algorithm for wheeled mobile robots with dynamic constraints. Journal of Intelligent and Robotic Systems, vol. 24, pp. 367-385.
Huang, Y., Yong, S. Z., Chen, Y. (2021). Stability Control of Autonomous Ground Vehicles Using Control-Dependent Barrier Functions. IEEE Transactions on Intelligent Vehicles (Early Access) (DOI: 10.1109/TIV.2021.3058064).
Jankovic, M. (2017). Combining control Lyapunov and barrier functions for constrained stabilization of nonlinear systems. in Proceedings of American Control Conference, pp. 1916-1922.
Kim, S. W., Liu, W., Ang Jr., M. H., Frazzoli, E., and Rus, D. (2015). The impact of cooperative perception on decision making and planning of autonomous vehicles. IEEE Intelligent Transportation Systems Magazine, pp. 39-50.
Li, X., Sun, Z., Cao, D., He, Z., and Zhu, Q. (2016). Real-time trajectory planning for autonomous urban driving: framework, algorithms, and verifications. IEEE/ASME Transactions on Mechatronics, vol. 21, No. 2, pp. 740-753.
Ji, J., Khajepour, A., Melek, W. W., and Huang, Y. (2017). Path planning and tracking for vehicle collision avoidance based on model predictive control with multiconstraints. IEEE Transactions on Vehicular Technology, vol. 66, No. 2, pp. 952-964.
Liang, W., Medanic, J., and Ruhl, R. (2008). Analytical dynamic tire model. Vehicle System Dynamics, vol. 46, No. 3, pp. 197-227.
Lindemann, L. and Dimarogonas, D. V. (2019). Control barrier functions for signal temporal logic tasks. IEEE Control System Letters, vol. 3, No. 1, pp. 96-101.
Minaker, B. P. and Rieveley, R. J. (2010). Automatic generation of the non-holonomic equations of motion for vehicle stability analysis. Vehicle System Dynamics, vol. 48, No. 9.
Munoz, V., Ollero, A., Prado, M., and Simon, A. (1994). Mobile robot trajectory planning with dynamic and kinematic constraints. in Proceedings of the IEEE International Conference on Robotics and Automation, San Diego, Ca, USA.
National Highway Traffic Safety Administration. 2017. Estimating Lives Saved by Electronic Stability Control, 2011-2015. Washington, DC.
Nguyen, Q. and Sreenath, K. (2016). Exponential Control Barrier Functions for Enforcing High Relative-Degree Safety-Critical Constraints. in Proceedings of American Control Conference, pp. 322-328.
Ong, P. and Cortes, J. (2018). Event-triggered control design with performance barrier. in Proceedings of Conference on Decision and Control, pp. 951-956.
Shi, Y., Huang, Y., and Chen, Y., (2021). Trajectory planning of autonomous trucks for collision avoidance with rollover prevention. IEEE Transactions on Intelligent Vehicles (Early Access) (DOI: 10.1109/TITS.2021.3088293).
Snider, J. M. (2009). Automatic steering methods for autonomous automobile path tracking. Robotics Institute, Carnegie Mellon University, Pittsburgh, PA, USA, Tech. Rep. CMU-RI-TR-09-08.
Tanedo, F. (2013). Notes on non-holonomic constraints. Lecture, Cornell.
Weiskircher, T., Wang, Q., and Ayalew, B. (2017). Predictive guidance and control framework for (semi-) autonomous vehicles in public traffic. IEEE Transaction on Control Systems Technology, vol. 25, No. 6, pp. 2034-2046.
Xu, X. (2018). Constrained control of input-output linearizable system using control sharing barrier functions. Automatica, vol. 87, pp. 195-201.

* cited by examiner

SYSTEMS AND METHODS FOR SAFETY-GUARANTEED DRIVING CONTROL OF AUTOMATED VEHICLES VIA INTEGRATED CLFS AND CDBFS

CROSS-REFERENCE TO RELATED APPLICATIONS

This is a U.S. Non-Provisional Patent Application that claims benefit to U.S. Provisional Patent Application Ser. No. 63/374,483 filed 2 Sep. 2022, which is herein incorporated by reference in its entirety.

FIELD

The present disclosure generally relates to automated vehicle control systems, and in particular, to a system and associated method for ensuring high tracking control performance for control-dependent and time-varying safety constraints in an automated vehicle control system.

BACKGROUND

Advanced vehicle control systems (e.g., electronic stability control (ESC)), which greatly reduce accident rates and fatality when accidents do occur, realize partial functions of automated vehicles (AVs). According to an NHTSA report, in 2015, an estimated 1949 lives were saved by ESC among passenger vehicle occupants. A well-designed vehicle safety control system is able to ensure vehicle safety in many driving scenarios by cooperating with other advanced perception and path planning systems.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

1. Introduction

A system and associated methods for automated vehicle (AV) control are described herein. In particular, a vehicle control system handles control-dependent and time-varying safety constraints using control-dependent barrier functions (CDBFs) and time-varying control barrier functions (TCBFs) integrated with control Lyapunov functions (CLFs) modeled in a quadratic programming problem which aims to achieve good tracking control with guaranteed vehicle safety. In the integration step, a mismatch between different forms of constraints is coordinated using second-order invariant constraints.

Figure 1A:
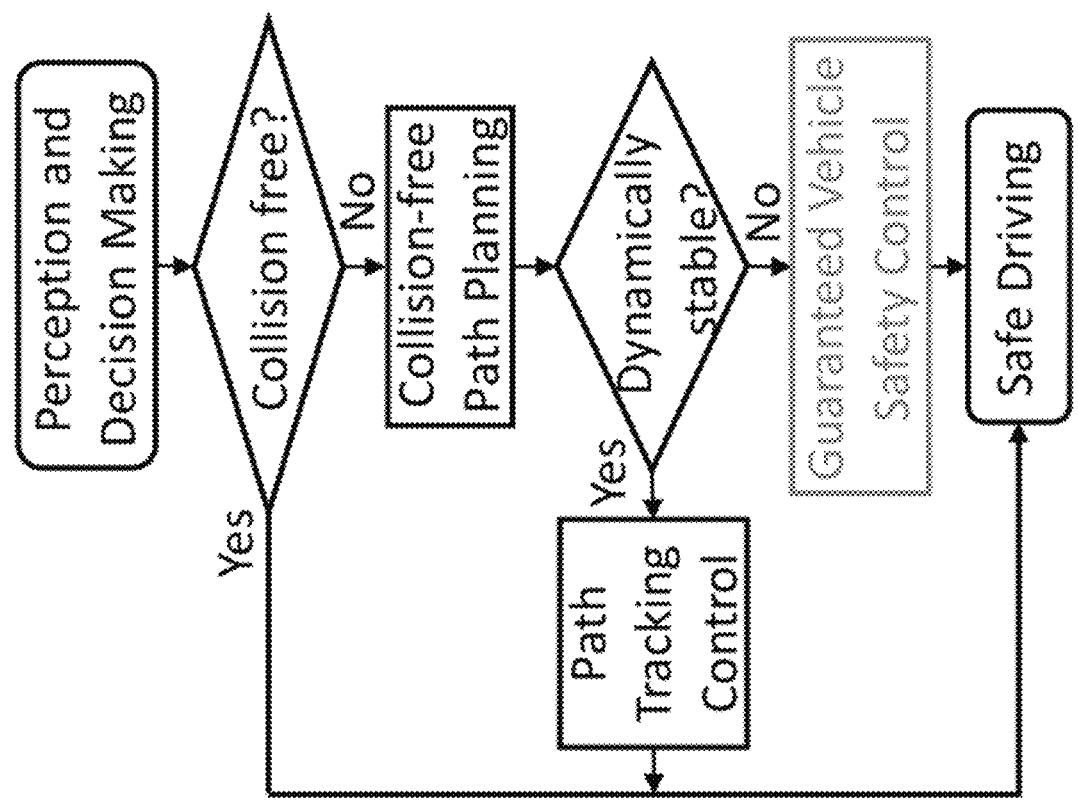
FIG. 1A is a flowchart showing an automated vehicle safety control process.

A typical safety-related AV control procedure includes the following steps shown in FIG. 1A. First, based on the sensing and perception of the surrounding environment, the decision-making algorithm determines if a collision or danger will happen. If yes, a collision-free path will be (re)planned and then well-tracked. For path planning, various methods were proposed to generate a collision-free path. However, even if a collision free-path was planned, vehicle safety cannot be guaranteed due to the unsecured vehicle path tracking performance. Although vehicle (kinematic) safety and (dynamic) stability could be controlled separately, these two aspects are always closely related to the control of AVs. Normally, a good tracking performance for the planned path also relies on stable vehicle dynamics as an essential requirement. Thus, if the planned path cannot be well tracked due to the lack of stability of vehicle dynamics, a tracking controller with guaranteed vehicle dynamic stability becomes necessary.

As shown in FIG. 1A, a safety-guaranteed driving control problem can be formulated as a path tracking control that satisfies both kinematic and dynamic safety constraints. To resolve such a problem, difference methods were proposed in previous studies. The first group of control methods relies on holonomic and non-holonomic constraints. In classical mechanics, holonomic constraints describe the relationships between position variables as follows:

$$f(q_1, q_2, q_3, \ldots, q_n, t) = 0 \tag{1}$$

where $q_1, q_2, q_3, \ldots, q_n, \dot{q}_1, \dot{q}_2, \dot{q}_3, \ldots, \dot{q}_n, t=0$ are the n coordinates that describe the system. Moreover, a constraint depending on both q and $\dot{q}$ is defined as a hon-holonomic constraint:

$$f(q_1, q_2, q_3, \ldots, q_n, \dot{q}_1, \dot{q}_2, \dot{q}_3, \ldots, \dot{q}_n, t) = 0 \tag{2}$$

If (1) and (2) are inequalities, they are also generally considered as non-holonomic constraints. These constraints were usually adopted in the robot path tracking control with some dynamic constraints.

Second, model predictive control (MPC) is also widely adopted as a method to handle constraints. For example, for obstacle avoidance, a system employing MPC can first plan a collision-free path with partially considered kinematic constraints based on a defined augmented system model, which contained multiple kinematic and dynamic variables. A path tracking MPC must be designed to handle both kinematic and dynamic constraints. Normally, for vehicle safety control, some common kinematic and dynamic constraints include:

a) Left and right road boundaries
b) Distance to the obstacle
c) Maximum and minimum side slip angle and yaw rate
d) Upper-speed limit and steering rate limitation
e) Maximum braking force
f) Longitudinal and lateral acceleration limits
g) Tire-road adhesion force saturation.

However, when vehicle safety constraints cannot be expressed in (non-)holonomic forms and the real-time implementation of control algorithms is required, the aforementioned two methods may not be feasible.

A third control method integrates performance control (e.g., tracking control) with guaranteed safety (e.g., control barrier functions (CBFs)), without being limited by the constraint forms and implementation issues. Among different types of integration, control Lyapunov functions (CLF) paired with CBFs can be effective, where one or multiple CLF and CBF are integrated together to achieve required control performance with guaranteed system safety (e.g., tracking a desired path with guaranteed vehicle dynamic stability). One main advantage of the CLF-CBF method is that it avoids additional triggers or switches between the performance and safety control algorithms. Due to the features of CLF and CBF, the system performance and safety could be controlled simultaneously by applying constraints derived by CLF and CBF in an optimization problem.

Although the CLF-CBF method shows advantages, CBFs may not always be applicable to describe time-varying and control-dependent safety constraints for safety-guaranteed vehicle control. Instead, a control-dependent barrier function (CDBF) is outlined herein (section 2) to enforce control-dependent safety constraints. In addition, time-varying CBFs (TCBFs) could be used to handle time-varying constraints. However, combining CDBF, TCBF, and CLF to enforce safety constraints for control of a vehicle is not straightforward due to inherent incompatibility in how constraints of CDBF, TCBF, and CLF are defined. For example, constraints of CBF (including TCBF) and CLFs are typically written as linear functions of a vector of control inputs. In contrast, as will be described further herein, constraints of CDBF must be solved in terms of a derivative, or rate of change, of the vector of control inputs. In their current forms, the constraints of CDBF, TCBF, and CLF cannot be easily incorporated together in real-time to find suitable control inputs for control of a vehicle.

Therefore, to extend CDBF to an integrated CLF with CDBF and TCBF for vehicle tracking control with guaranteed safety, the present disclosure outlines a "CLF-TCBF-CDBF control" method that enables a computing system of a vehicle to use CLF, TCBF, and CDBF together when determining control inputs for the vehicle. Specifically, the present disclosure aims to resolve the compatibility problem of different constraint forms. The CLF-TCBF-CDBF control method is successfully applied as demonstrated herein to achieve safety-guaranteed driving control for AVs. The remainder of this disclosure is organized as follows. In Section 2, preliminaries about the vehicle, a vehicle safety control system, and CDBF are first introduced. In Section 3.1, to enable integration of CDBF with CLF and TCBF, second-order versions of CLF and CBF (extendable to TCBF) are outlined. Then, Section 3.2 outlines that integration of (second-order) CLF with (second-order) TCBF and CDBF in the form of a safety-guaranteed vehicle lateral control problem that can be solved through a quadratic programming (QP) method. Co-simulation results between CarSim® and Simulink are presented and discussed in Section 4. Finally, conclusive remarks are given in Section 5. Additional information about a method and a computing device for implementation of the vehicle safety control system are outlined in sections 6 and 7, respectively.

2. Vehicle Model and CDBF

Figure 1B:
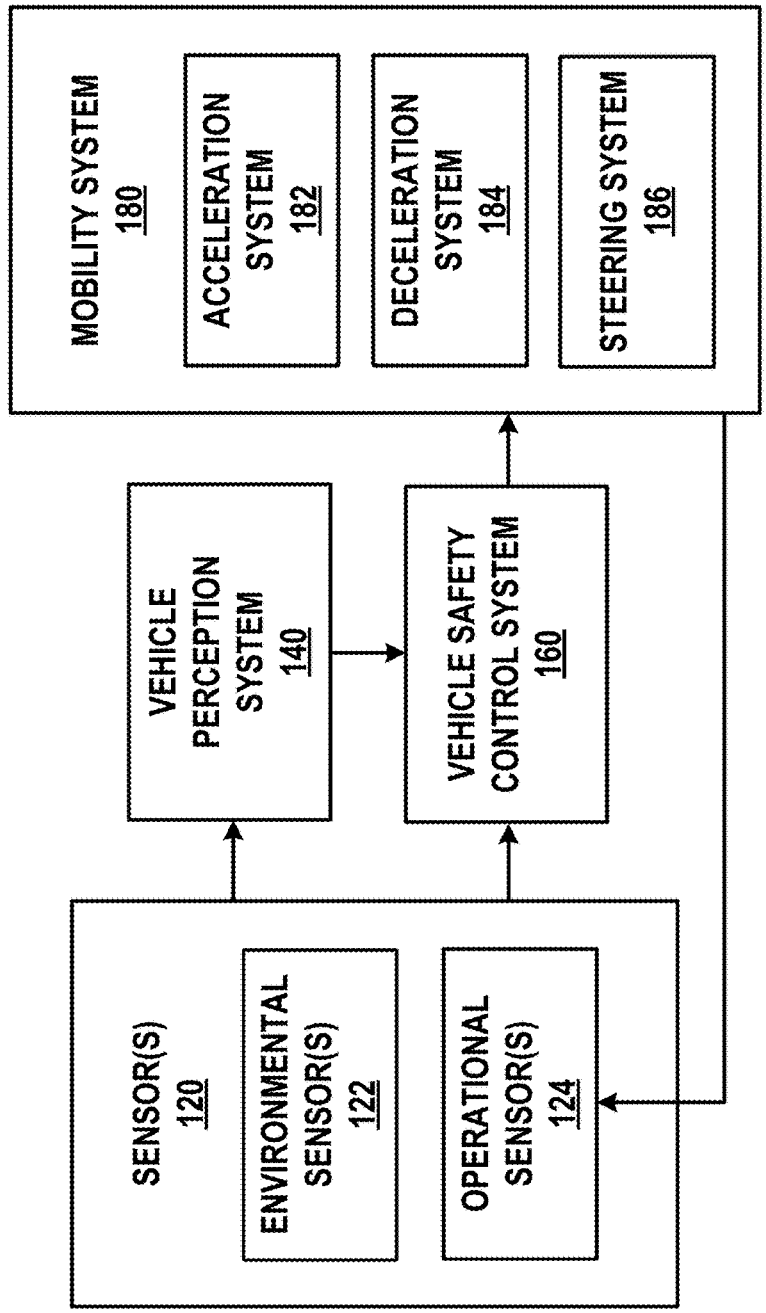
FIG. 1B is a simplified diagram showing a vehicle for implementation of vehicle stability methods described herein.

In this section, some preliminaries including the vehicle model and CDBFs are briefly introduced. FIG. 1B illustrates a vehicle 100 including a vehicle safety control system 160, which can be computer-implemented (e.g., by processor 320 shown in FIG. 10) implementing various methods described herein (e.g., method 200 shown in FIG. 9, also referred to herein as "CLF-TCBF-CDBF control method"). The vehicle 100 includes sensors 120 including various environmental sensors 122 for sensing aspects of a surrounding environment (e.g., objects, lane lines, other vehicles, etc.), and various operational sensors 124 that sense various aspects of the operation of the vehicle (e.g., speed, heading, etc.). The sensors 120 communicate with a vehicle perception system 140 that enable the vehicle 100 to process aspects of the surrounding environment, and further communicate with the vehicle safety control system 160 that applies control inputs to a mobility system 180 of the vehicle 100 based on the information captured by the vehicle perception system 140. The mobility system 180 can include an acceleration system 182, a deceleration system 184 and a steering system 186 that respond to control inputs from the vehicle safety control system 160.

Figure 1C:
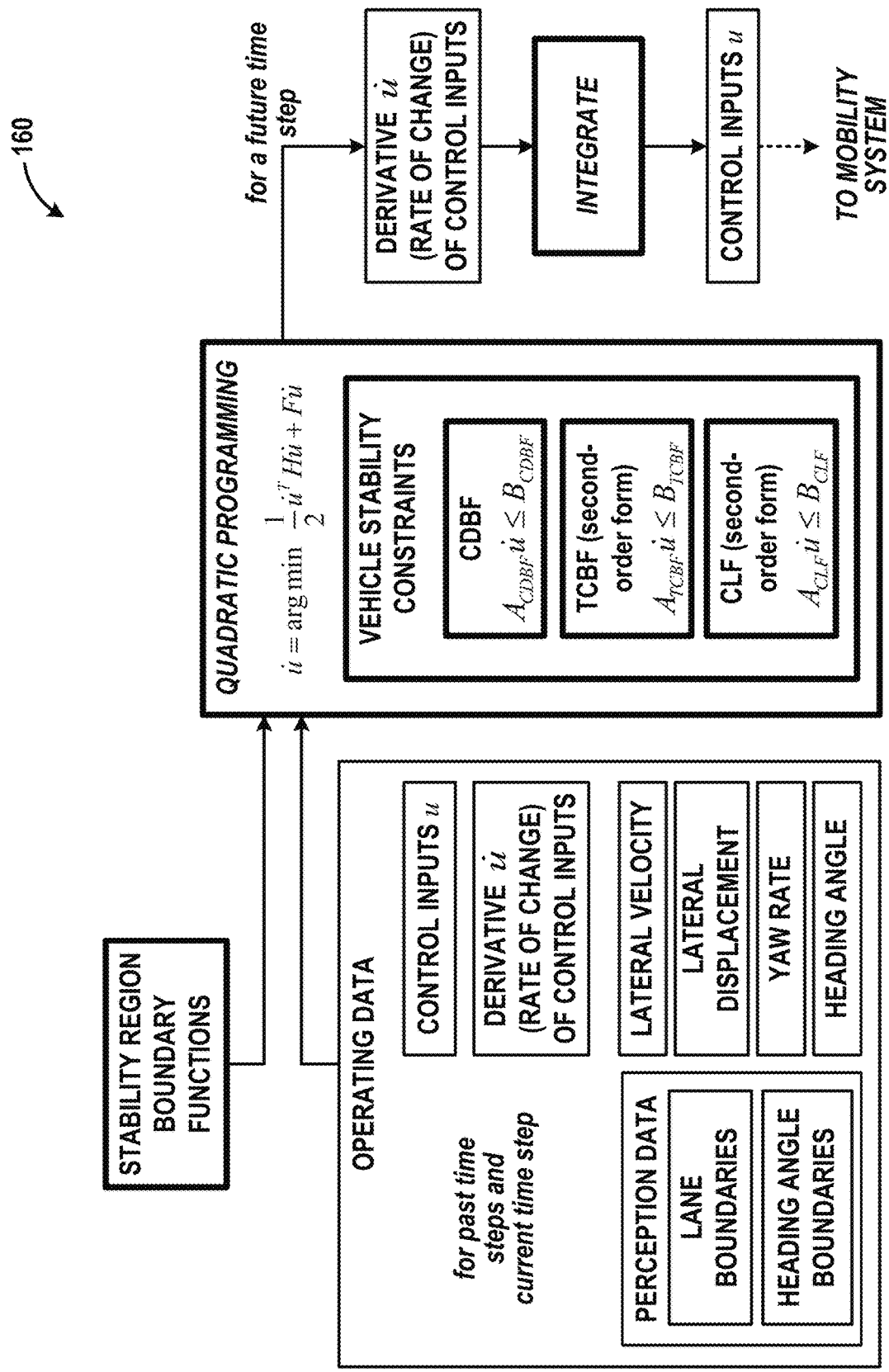
FIG. 1C is a diagram showing determination of a control input using on CLF-TCBF-CDBF vehicle stability control of a vehicle safety control system of the vehicle of FIG. 1B.

FIG. 1C shows further detail of the vehicle safety control system 160 that implements the CLF-TCBF-CDBF control method described in section 3 herein. The vehicle safety control system 160 is operable to receive information (e.g., operating data of the vehicle including vehicle perception data) from the sensor(s) 120 and vehicle perception system 140, evaluate the information to determine a value of a control input according to safety constraints using the CLF-TCBF-CDBF control method, and apply control inputs to the mobility system 180 based on the safety control constraints.

The vehicle safety control system 160 can include or otherwise communicate with a processor (e.g., processor 320 of FIG. 10) that accesses operating data descriptive of operation of the vehicle 100, including a rate of change (derivative) of a set of control inputs being applied to the vehicle 100 at a current time step. Based on the operating data, the vehicle safety control system 160 can determine an updated rate of change of the set of control inputs for application to the vehicle 100 at a future time step that satisfies a set of vehicle stability constraints in view of the operating data of the vehicle 100.

The set of vehicle stability constraints include: a TCBF constraint in a second-order form that that enforces a time-varying control barrier function defining time-varying safety boundaries of the vehicle 100; a CDBF constraint that enforces a control-dependent barrier function defining control-dependent safety boundaries for operation of the vehicle 100; and a CLF constraint in a second-order form that enforces a control Lyapunov function defining tracking control boundaries for operation of the vehicle 100. Because CDBF is defined with respect to the derivative of the set of control inputs, the TCBF and CLF constraints are modified as outlined herein to be expressly in terms of the derivative of the set of control inputs for compatibility. This allows joint enforcement of all three vehicle stability constraints when determining the updated rate of change of the set of control inputs.

The vehicle safety control system 160 can apply a quadratic programming method to determine the updated derivative of the set of control inputs that satisfies the set of vehicle stability constraints in view of the operating data of the vehicle 100. The updated derivative can then be integrated to determine updated values of the set of control inputs, which can then be applied as input to the mobility system 180 of the vehicle 100.

In some embodiments where the vehicle safety control system 160 is applied to plan an emergent lane change maneuver, the vehicle safety control system 160 can also incorporate lane boundaries (that limit a lateral displacement of the vehicle 100), heading angle boundaries (that limit a heading angle of the vehicle 100), and a set of stability region boundary functions into its evaluation to ensure that the resulting control inputs do not violate safety and stability boundaries. In this case, the set of control inputs would include a front wheel steering angle value and a yaw moment value of the vehicle 100.

For the emergent lane change maneuver, the time-varying safety boundaries of the TCBF constraint ensure that the global lateral displacement value that results from the updated rate of change of the set of control inputs does not violate the set of lane boundaries. The time-varying safety boundaries of the TCBF constraint also ensure that the heading angle that results from the updated rate of change of the set of control inputs does not violate the set of heading angle boundaries.

Further, for the emergent lane change maneuver, the control-dependent safety boundaries of the CDBF constraint ensure that a yaw rate and a lateral velocity of the vehicle that result from the updated rate of change of the set of control inputs are within the stability region of the vehicle defined by the set of stability region boundary functions.

Note that while the following examples are discussed in terms of variables relevant to the emergent lane change maneuver, the vehicle safety control system 160 implementing the CLF-TCBF-CDBF control method presented herein can be adapted to ensure vehicle safety for other types of maneuvers.

2.1 Vehicle Model

A single-track vehicle model is adopted in this disclosure. The CLF-TCBF-CDBF control method is presented in terms of constraints for an emergent lane change maneuver to be executed by the vehicle 100. Note that the CLF-TCBF-CDBF control method outlined herein can be extended and adapted to other types of control inputs relevant to other types of maneuvers that may be executed by the vehicle 100. For the illustrative examples outlined herein, system state variables are selected as $x=[Y\theta V_y r]^T$ where Y is the global lateral displacement, $\theta$ is the heading angle, $V_y$ is the lateral velocity, and r is the yaw rate. Assume the vehicle 100 has a small sideslip angle ($\beta$), the vehicle lateral kinematics and dynamics are described as:

$$\dot{Y} = V_y + V_x \sin(\theta) \quad (3)$$

$$\dot{\theta} = r$$

-continued $$\dot{V}_y = \frac{1}{m}(F_{yf}\cos\delta_f + F_{yr}) - V_x r,$$

$$\dot{r} = \frac{1}{I_Z}(l_f F_{yf}\cos\delta_f - l_r F_{yr} + M_{DYC})$$

where m, $V_x$, $l_f$, $l_r$, and $I_Z$ are the vehicle mass, longitudinal velocity, front wheelbase, rear wheelbase, and yaw moment of inertia, respectively. $F_{yf}$ and $F_{yr}$ are the front and rear tire lateral forces, which are calculated by a nonlinear LuGre tire model. The tire slip angles are calculated as:

$$a_f = \delta_f - \tan^{-1}\left(\frac{V_y + l_f r}{V_x}\right); \quad a_r = -\tan^{-1}\left(\frac{V_y - l_r r}{V_x}\right). \quad (4)$$

The vehicle control inputs u are selected as the front wheel steering angle $\delta_f$ and yaw moment $M_{DYC}$, $u=[\delta_f \ M_{DYC}]^T$.

2.2 CDBF

CDBF is used to accurately describe the vehicle handling stability using the vehicle lateral stability region. The formal definition of CDBF is as follows:

Definition 1. "Consider a nonlinear system $\dot{x}=f(x,u)$, where u is differentiable and its derivative is bounded by a polytope, e.g., $\dot{u}=\omega$ and $\omega \in \Omega$."

Taking the control input u as a new state, an augmented system is written as:

$$\dot{\hat{x}} \triangleq \begin{bmatrix} \dot{x} \\ \dot{u} \end{bmatrix} = \begin{bmatrix} f(x,u) \\ \omega \end{bmatrix} = \hat{f}(\hat{x}, \omega), \quad (5)$$

where $\hat{x}=[x \ u]^T$. For a set $\psi(x,u)$ defined by a continuously differentiable function h(x, u):

$$h(x,u) \geq 0, \forall x \in \psi(x,u), \quad (6)$$

$$h(x,u)=0, \forall x \in \partial\psi(x,u), \quad (7)$$

$$h(x,u)>0, \forall x \in f(\psi(x,u)) \quad (8)$$

if there exists a control $u \in U$, $\omega \in \Omega$ (such that $\dot{u}=\omega$ points inward of U) and an extended class K function $\alpha$, such that a continuously differentiable function B(x,u) satisfies:

$$\inf_{x \in f(\psi(x,u))} B(x, u) \geq 0, \quad (9)$$

$$\inf_{x \to \partial\psi(x,u)} B(x, u) = \infty, \quad (10)$$

$$L_{\hat{f}} B(x, u) - a(h(x, u)) \leq 0, \quad (11)$$

or the function h(x, u) satisfies $$L_{\hat{f}} h(x,u) + \alpha(h(x,u)) \geq 0, \quad (0)$$

then the set $\Psi(x,u)$ is a control-dependent invariant set. B(x, u) is a reciprocal CDBF and h(x, u) is a zeroing CDBF".

The main motivation for CDBF is that some invariant sets (e.g. vehicle handling stability regions), are changing with respect to control inputs (e.g. steering angles). Thus, other CBFs cannot describe such invariant sets and satisfy the corresponding control requirements.

3. Integrated CLF-CDBF Based Vehicle

In this section, second-order invariant constraints applicable to CLF and TCBF are first described to ensure compatibility with CDBF. Then, details and formulation of the CLF-TCBF-CDBF control method implemented by the vehicle safety control system 160 of FIG. 1C are described.

3.1 Second-Order Invariant Constraints

Since the expanded expressions of the Lie derivatives in (11) and (12) include the derivative $\dot{u}$ (e.g., rate of change) of control input u, a resulting QP problem that uses (11) and (12) as linear constraints would actually need to be solved with respect to $\dot{u}$. The real value(s) of the control input u can then be calculated by integrating $\dot{u}$. However, as discussed, the constraints of TCBF and CLF are typically implemented as linear functions of control u. Therefore, to successfully integrate with the CDBF, the constraints involved in TCBF and CLF need to be modified in such a way that the control derivative $\dot{u}$ is explicitly expressed. As such, second-order invariant constraints of TCBF and CLF are outlined as follows.

Considering a linear constraint $Au \leq b$ derived by TCBF or CLF, define a new constraint function as:

$$\hat{h} = b - Au, \tag{13}$$

where $\hat{h} \geq 2$ implies the same condition as $Au \leq b$. To guarantee $\hat{h} \geq 0$, the invariance condition can be applied. Based on the ZCBF constraint, as long as $$L_f \hat{h} + \alpha(\hat{h}) \geq 0 \tag{14}$$

is satisfied, $\hat{h} \geq 0$ is guaranteed. Expanding (14):

$$\dot{b} - (\dot{A}u + A\dot{u}) + \alpha(\hat{h}) \geq 0. \tag{15}$$

Equation (15) can be rewritten in a linear form of $\dot{u}$ as:

$$A\dot{u} \leq \dot{b} - \dot{A}u + \alpha(b - Au). \tag{16}$$

Therefore, (16) can be successfully integrated with the constraints derived by CDBF in a QP optimization problem, where it is selected as the control variable. Generally, the same procedure is also applicable for CBF and TCBF.

3.2 Integrating CLF with CDBF and TCBF

Figure 10:
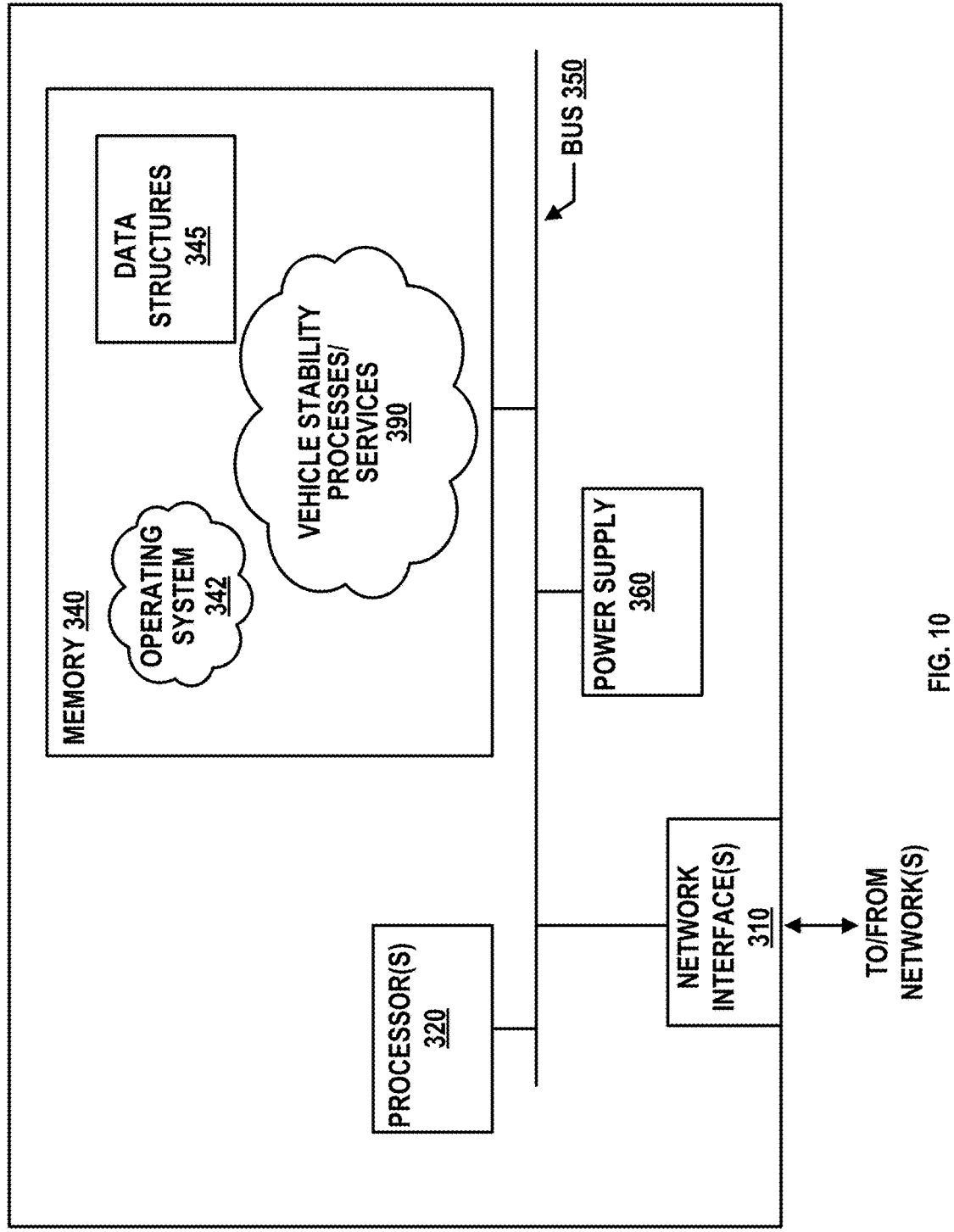
FIG. 10 is a simplified diagram showing an exemplary computing system for implementation of the vehicle safety control system of FIG. 1C and method of FIG. 9.

In this subsection, with continued reference to the vehicle safety control system 160 of FIG. 10, the second-order CLF, second-order TCBF, and CDBF constraints for an emergent lane change maneuver are first formulated independently such that they are compatible with one another. Then, a QP problem is formulated to integrate these different constraints together.

Figure 2:
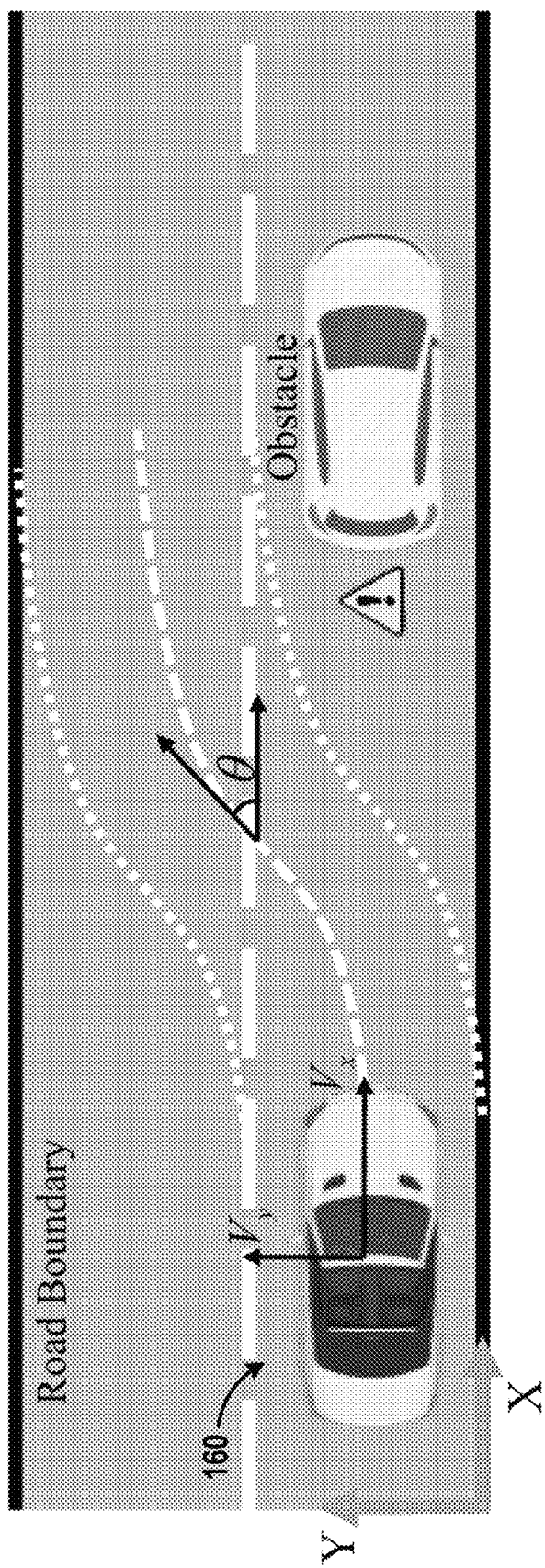
FIG. 2 is a simplified illustration showing an emergent lane change maneuver studied with respect to the vehicle stability methods described herein.

First, in real traffic scenarios, with the consideration of vehicle dimensions (width) and road boundaries, certain tracking performance tolerances need to be considered and satisfied. In FIG. 2, two virtual boundaries (small-dot curves) are planned with respect to the vehicle global lateral displacement (Y) as two time-varying functions, where Y is required to be bounded as $Y_{min} < Y < Y_{max}$. Meanwhile, the heading angle should also be controlled in a reasonable range as $\theta_{min} < \theta < \theta_{max}$, which limits the moving direction of the vehicle.

Thus, two safety sets are defined as:

$$\psi_1 = \{x | h_1(x,t) = (Y_{max}(t) - Y)(Y - Y_{min}(t)) \geq 0\}, \tag{17}$$

$$\psi_2 = \{x | h_2(x,t) = (\theta_{max}(t) - \theta)(\theta - \theta_{min}(t)) \geq 0\}, \tag{18}$$

Since the upper and lower boundaries of Y and $\theta$ are formulated as known time-varying functions, $h_1$ and $h_2$ are also time-varying and their Lie derivatives are written as:

$$L_f h_i(x, t) = \frac{\partial h_i(x, t)}{\partial x} \dot{x} + \frac{\partial h_i(x, t)}{\partial t}, \ i = 1, 2. \tag{19}$$

Substituting (17) and (18) into (19), $$L_f h_1(Y, t) = \frac{\partial h_1(Y, t)}{\partial Y} \dot{Y} + \frac{\partial h_1(Y, t)}{\partial t} = \tag{20}$$

$$[(Y_{max} + Y_{min} - 2Y)\dot{Y}] + [(\dot{Y}_{max} + \dot{Y}_{min})Y - (\dot{Y}_{max} Y_{min} + Y_{max} \dot{Y}_{min})],$$

$$L_f h_2(\theta, t) = \frac{\partial h_2(\theta, t)}{\partial \theta} \dot{\theta} + \frac{\partial h_2(\theta, t)}{\partial t} = \tag{21}$$

$$[(\theta_{max} + \theta_{min} - 2\theta)\dot{\theta}] + [(\dot{\theta}_{max} + \dot{\theta}_{min})\theta - (\dot{\theta}_{max} \theta_{min} + \theta_{max} \dot{\theta}_{min})].$$

Substituting (20) and (21) into (12), the TCBF conditions can be written as:

$$(Y_{max} + Y_{min} - 2Y)\dot{Y} + (\dot{Y}_{max} + \dot{Y}_{min})Y - \tag{22}$$

$$(\dot{Y}_{max} Y_{min} + Y_{max} \dot{Y}_{min}) + a_1(h_1(x, t)) \geq 0,$$

$$(\theta_{max} + \theta_{min} - 2\theta)\dot{\theta} + (\dot{\theta}_{max} + \dot{\theta}_{min})\theta - \tag{23}$$

$$(\dot{\theta}_{max} \theta_{min} + \theta_{max} \dot{\theta}_{min}) + a_2(h_2(x, t)) \geq 0.$$

To express the constraints in (22) and (23) as functions of control inputs, new TCBFs are first constructed by substituting $\dot{Y}$ and $\dot{\theta}$ dynamics from (3) into (22) and (23):

$$h'_1(x, t) = (Y_{max} + Y_{min} - 2Y)(V_y + V_x \theta) + \tag{24}$$

$$(\dot{Y}_{max} + \dot{Y}_{min})Y - (\dot{Y}_{max} Y_{min} + Y_{max} \dot{Y}_{min}) + a_1(h_1(x, t)) \geq 0,$$

$$h'_2(x, t) = (\theta_{max} + \theta_{min} - 2\theta)r + (\dot{\theta}_{max} + \dot{\theta}_{min})\theta - \tag{25}$$

$$(\dot{\theta}_{max} \theta_{min} + \theta_{max} \dot{\theta}_{min}) + a_2(h_2(x, t)) \geq 0.$$

Then, the ZCBF condition of (12) can be applied to (24) and (25) again as:

$$L_f h'_i(x, t) + a'_i(h'_i(x, t)) \geq 0, \ i = 1, 2, \tag{26}$$

where $$L_f h'_1(x, t) = \tag{27}$$

$$\left(\frac{\partial h'_1(x, t)}{\partial V_y}\right) \dot{V}_y + \left(\frac{\partial h'_1(x, t)}{\partial \theta}\right) \dot{\theta} + \left(\frac{\partial h'_1(x, t)}{\partial Y}\right) \dot{Y} + \left(\frac{\partial h'_1(x, t)}{\partial t}\right),$$

$$L_f h'_2(x, t) = \left(\frac{\partial h'_2(x, t)}{\partial r}\right) \dot{r} + \left(\frac{\partial h'_2(x, t)}{\partial \theta}\right) \dot{\theta} + \left(\frac{\partial h'_2(x, t)}{\partial t}\right). \tag{28}$$

Substituting the expressions of $\dot{V}_y$ and $\dot{r}$ (3) into (26), the inequalities with respect to the control input u are derived as:

$$A_{1TCBF} u \geq B_{1TCBF}, \tag{29}$$

$$A_{2TCBF} \geq B_{2TCBF}. \tag{30}$$

where $A_{iTCBF}$ and $B_{iTCBF}$ (i=1,2) are described as follows:

$$A_{1TCBF} = -\frac{\partial h'_1(x, t)}{\partial V_y}, \tag{31}$$

$$B_{1TCBF} = \frac{\partial h'_1(x, t)}{\partial V_y} \dot{V}_y + \left(\frac{\partial h'_1(x, t)}{\partial \theta}\right) \dot{\theta} + \tag{32}$$

$$\left(\frac{\partial h'_1(x, t)}{\partial Y}\right) \dot{Y} + \left(\frac{\partial h'_1(x, t)}{\partial t}\right) + a'_1(h'_1(x, t)),$$

-continued where, $$\frac{\partial h'_1(x,t)}{\partial V_y} = Y_{max} + Y_{min} - 2Y, \quad (33)$$

$$\frac{\partial h'_1(x,t)}{\partial \theta} = (Y_{max} + Y_{min} - 2Y)V_x, \quad (34)$$

$$\frac{\partial h'_1(x,t)}{\partial Y} = -2(V_y + V_x\theta) + \dot{Y}_{max} + \dot{Y}_{min} + a_1(Y_{max} + Y_{min} - 2Y), \quad (35)$$

$$\frac{\partial h'_1(x,t)}{\partial t} = \ddot{Y}_{max} + \ddot{Y}_{min} + \ddot{Y}_{max} + \ddot{Y}_{min} - \left(\ddot{Y}_{max}Y_{min} + 2\dot{Y}_{max}\dot{Y}_{min} + Y_{max}\ddot{Y}_{min}\right) + a_1\left(\dot{Y}_{max} + \dot{Y}_{min} - \dot{Y}_{max}Y_{min} - Y_{max}\dot{Y}_{min}\right), \quad (36)$$

and, $$A_{2TCBF} = \frac{-\partial h'_2(x,t)}{\partial r}, \quad (37)$$

$$B_{2TCBF} = \frac{-\partial h'_2(x,t)}{\partial r}\dot{r} + \left(\frac{\partial h'_2(x,t)}{\partial \theta}\right)\dot{\theta} + \left(\frac{\partial h'_2(x,t)}{\partial t}\right) + a'_2(h'_2(x,t)), \quad (38)$$

where, $$\frac{\partial h'_2(x,t)}{\partial r} = \theta_{max} + \theta_{min} - 2\theta, \quad (39)$$

$$\frac{\partial h'_2(x,t)}{\partial \theta} = -2r + \dot{\theta}'_{max} + \dot{\theta}'_{min} + a_2(\theta_{max} + \theta_{min} - 2\theta), \quad (40)$$

$$\frac{\partial h'_2(x,t)}{\partial t} = \dot{\theta}_{max} + \dot{\theta}_{min} + \ddot{\theta}_{max} + \ddot{\theta}_{min} - \left(\ddot{\theta}_{max}\theta_{min} + 2\dot{\theta}_{max}\dot{\theta}_{min} + \theta_{max}\ddot{\theta}_{min}\right) + a_2\left(\dot{\theta}_{max} + \dot{\theta}_{min} - \dot{\theta}_{max}\theta_{min} - \theta_{max}\dot{\theta}_{min}\right). \quad (41)$$

Note that $\ddot{Y}_{max}$, $\ddot{Y}_{min}$, $\ddot{\theta}_{max}$ and $\ddot{\theta}_{min}$ in (36) and (41) are assumed to be known since $Y$ and $\theta$ are formulated as known time-varying functions.

Second, to guarantee vehicle dynamic stability, the CDBF with respect to stability regions is utilized. The state constraints can be represented by using the functions of stability region boundaries. To describe the dynamic stability set, the zeroing CDBFs are written as:

$$h_3(x,u) = b_1[V_y - s_1(u)] - [r - s_2(u)] + c_1, \quad (42)$$

$$h_4(x,u) = b_2[V_y - s_1(u)] - [r - s_2(u)] + c_2, \quad (43)$$

$$h_5(x,u) = [r - s_2(u)] - b_3[V_y - s_1(u)] + c_3, \quad (44)$$

$$h_6(x,u) = [r - s_2(u)] - b_4[V_y - s_1(u)] + c_4, \quad (45)$$

where $$s_1(u) = \frac{V_x l_r u}{l_f + l_r} \text{ and } s_2(u) = \frac{V_x u}{l_f + l_r}$$

are the shifting functions. Applying the ZCDBF condition in (12) to (42)-(45):

$$L_f h_i(x,u) + \alpha_i(h_i(x,u)) \geq 0, i=3,4,5,6. \quad (46)$$

Equation (46) can then be transferred to the linear form of u as $A_{iTCBF}\dot{u} \leq B_{iTCBF}$, i=3,4,5,6.

In sum, for safety control, $h_1$ and $h_2$ are the TCBF since $[Y_{min}, Y_{max}]$ and $[\theta_{min}, \theta_{max}]$ are time-varying with a constant longitudinal speed $V_x$. $h_3$ to $h_6$ are the CDBF since the stability region boundary functions are control-dependent. Then, the TCBF and CDBF constraints are combined as:

$$A_{TCBF}\dot{u} \geq B_{TCBF}, \quad (47)$$

$$A_{CDBF}\dot{u} \geq B_{CDBF}, \quad (48)$$

where $A_{TCBF} = [A_{1TCBF}{}^T \ A_{2TCBF}{}^T]^T$, $B_{TCBF} = [B_{1TCBF}{}^T \ B_{2TCBF}{}^T]^T$, $A_{CDBF} = [A_{3CDBF}{}^T \ A_{4CDBF}{}^T \ A_{5CDBF}{}^T \ A_{6CDBF}{}^T]^T$, and $B_{CDBF} = [B_{3CDBF}{}^T \ B_{4CDBF}{}^T \ B_{5CDBF}{}^T \ B_{6CDBF}{}^T]^T$.

Third, the control input u is determined by CLF design to solve a path tracking problem. Given the lateral displacement and heading angle references as $Y_{ref}$ and $\theta_{ref}$, the path tracking errors are defined as $e_Y = Y - Y_{ref}$ and $e_\theta = \theta - \theta_{ref}$. In (3), since the global Y and $\theta$ are not directly controlled states, the path references are transferred to the desired values of local states ($V_y$ and r). Let $\dot{e}_Y = -ke_Y$ and $\dot{e}_\theta = -ke_\theta$ (k>0), then $\dot{Y} = -ke_Y + \dot{Y}_{ref}$ and $\dot{\theta} = -ke_\theta + \dot{\theta}_{ref}$. By substituting $\dot{Y}$ and $\dot{\theta}$ in from (3), the desired $V_y$ and r can be obtained as:

$$V_{yd} = -ke_Y \dot{Y}_{ref} - V_x\theta, \quad (49)$$

$$r_d = -ke_\theta + \dot{\theta}_{ref}. \quad (50)$$

Then, the tracking controller can be designed using CLF to track $V_{yd}$ and $r_d$. According to CLF design, for a nonlinear system:

$$\dot{x} = f(x,z) + g(x,z)u, \quad (51)$$

$$\dot{z} = q(x,z)$$

where x is the controlled state and z is the uncontrolled state, a continuously differentiable function $V: X \to R$ is an exponentially stabilizing CLF (ES-CLF) if there exists positive constants $c_1$, $c_2$, $c_3 > 0$ such that:

$$c_1\|x\|^2 \leq V(x) \leq c_2\|x\|^2, \quad (52)$$

$$\inf_{u \in U}[L_f V(x,z) + L_g V(x,z)u + c_3 V(x)] \leq 0 \quad (53)$$

for all $(x, z) \in X \times Z$. Equation (53) can be written in a linear form as $A_{CLF}u \geq B_{CLF}$, where $A_{CLF} = L_g V(x,z)$ and $B_{CLF} = -L_f V(x,z) - c_3 V(x)$.

To track $V_{yd}$ and $r_d$, two CLFs are constructed as $V_1(x) = (V_y - V_{yd})^2$ and $V_2(x) = (r - r_d)^2$. Thus, the final CLF constraints are:

$$A_{CLF}u \leq B_{CLF}, \quad (54)$$

where $A_{CLF} = \begin{bmatrix} L_g V_1(x) \\ L_g V_2(x) \end{bmatrix}$ and $B_{CLF} = \begin{bmatrix} -L_f V_1(x) - c_3 V_1(x) \\ -L_f V_2(x) - c_3 V_2(x) \end{bmatrix}$.

If CBF or CLF are locally Lipschitz, then the solution of the QP problem is also locally Lipschitz. The property also applies to CDBF since u in CBDF, as the integration of it is locally Lipschitz. Therefore, QP is a suitable method to integrate multiple constraints derived by CBF, CLF, and CDBF. Based on the derived second-order invariant constraints for TCBF and CLF in section 3.1, the constraints in (47) and (54) can be transferred to (56) and (57) in the following, respectively. Then, a QP problem with all three types of constraints is constructed as follows:

$$\dot{u} = \arg\min \tfrac{1}{2}\dot{u}^T H \dot{u} + F\dot{u}, \quad (55)$$

$$s.t. A_{TCBF}\dot{u} \leq B_{TCBF}, \quad (56)$$

$$A_{CLF}\dot{u} \leq B_{CLF}, \quad (57)$$

$$A_{CDBF}\dot{u} \leq B_{CDBF}. \quad (58)$$

While (55) returns the value of $\dot{u}$, the real control u can be finally obtained by integrating $\dot{u}$ with its initial value. H in (55) is an n×n dimensional real symmetric matrix and F in (55) is an n-dimensional vector. For comparison, a common CBF constraint derived from a fixed stability region, which is not control-dependent, is also formulated. The fixed vehicle lateral stability region is described by four time-invariant and control-independent functions $f_i(x)$, i=1,2,3,4. Following the second-order invariant constraints, a CBF constraint can be obtained as:

$$A_{CBF}\dot{u} \leq B_{CBF}. \quad (59)$$

In the next section, simulation results using different integrations among these four constraints ((56)-(59)) will be presented to show that the safety-guaranteed AV driving is achieved by integrating the CDBF and TCBF with CLF.

4. Simulation Results and Discussions

In this section, a low-mu ($\mu$=0.3) and high speed ($V_x$=90 km/h) single lane change scenario is set up in CarSim®/Simulink co-simulation environment. The results of four different cases using the following four different constraints (in Table I) are demonstrated and compared.

TABLE I

Simulation cases with different constraints.

| Case No. | Integration | Constraints No. |
|---|---|---|
| 1 | CLF-TCBF-CDBF | (56)(57)(58) |
| 2 | CLF-TCBF-CBF | (56)(57)(59) |
| 3 | CLF-CDBF | (56)(58) |
| 4 | CLF | (57) |

Case 1: CLF-TCBF-CDBF

Figure 3:
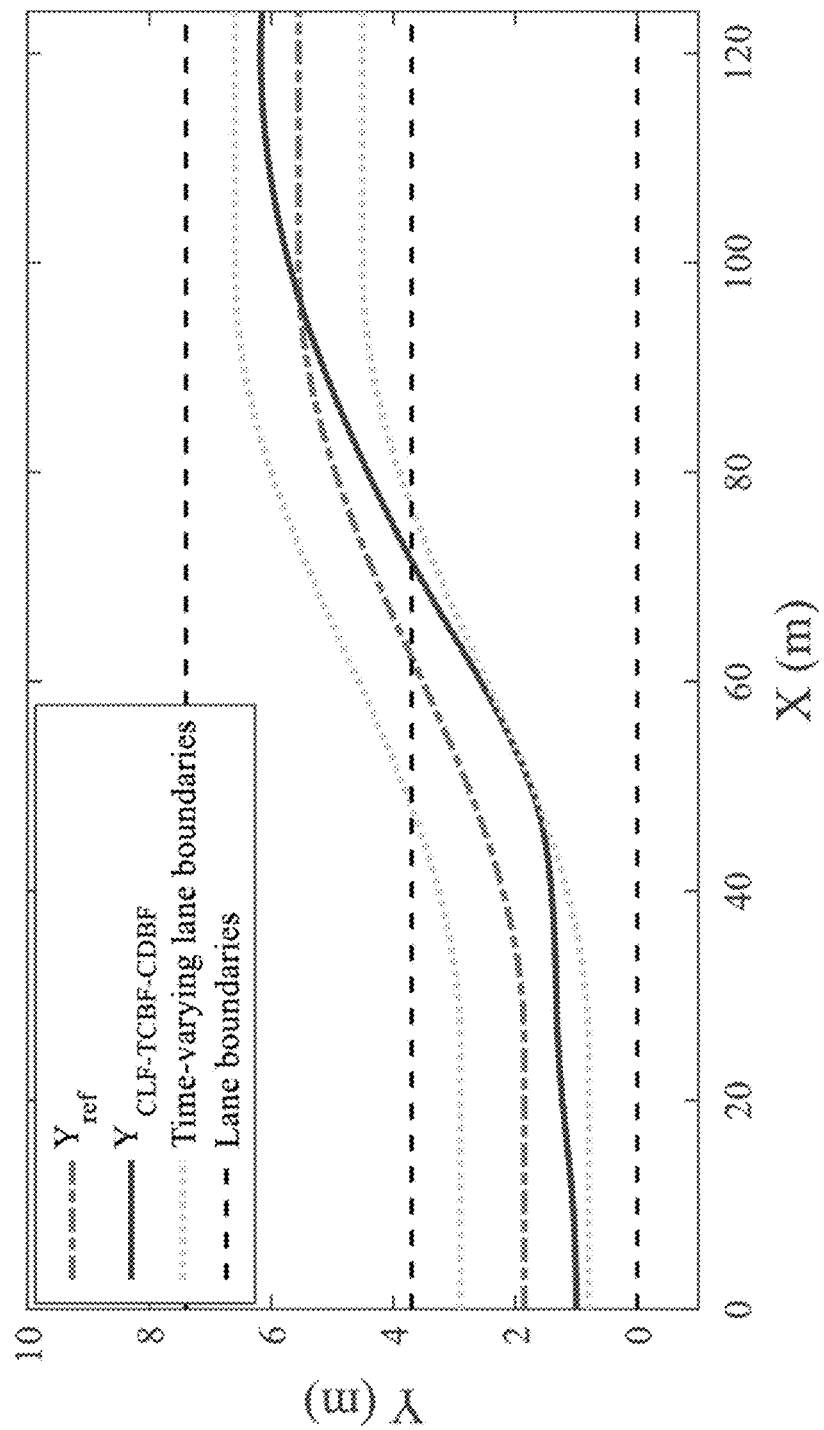
FIG. 3 is a graphical representation showing X-Y displacement results for CLF-TCBF-CDBF vehicle stability control described herein.
Figure 4A:
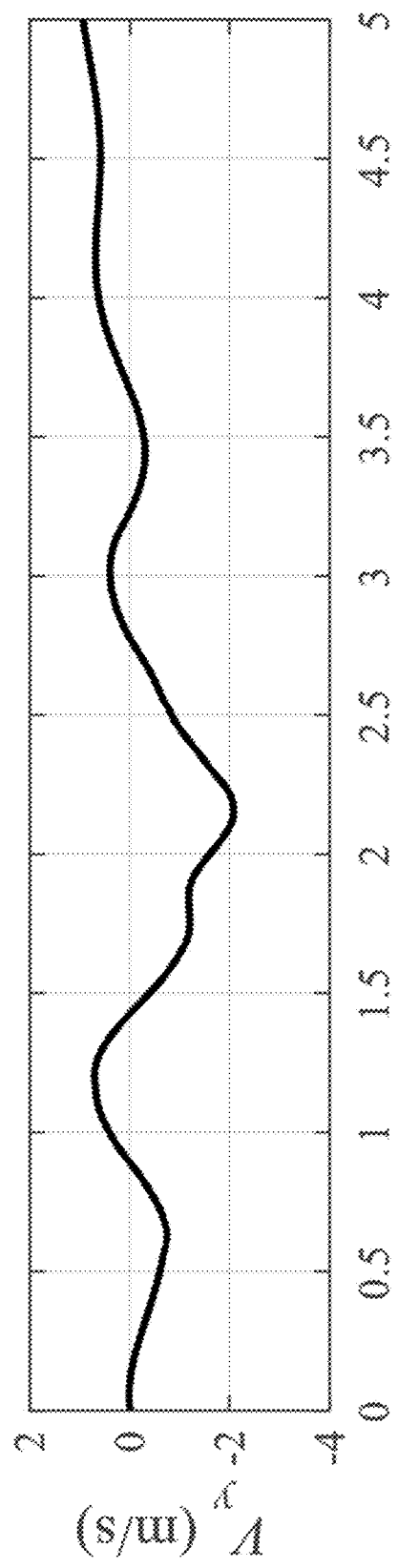
FIGS. 4A and 4B are a pair of graphical representations showing vehicle lateral stability results for CLF-TCBF-CDBF vehicle stability control described herein.
Figure 4B:
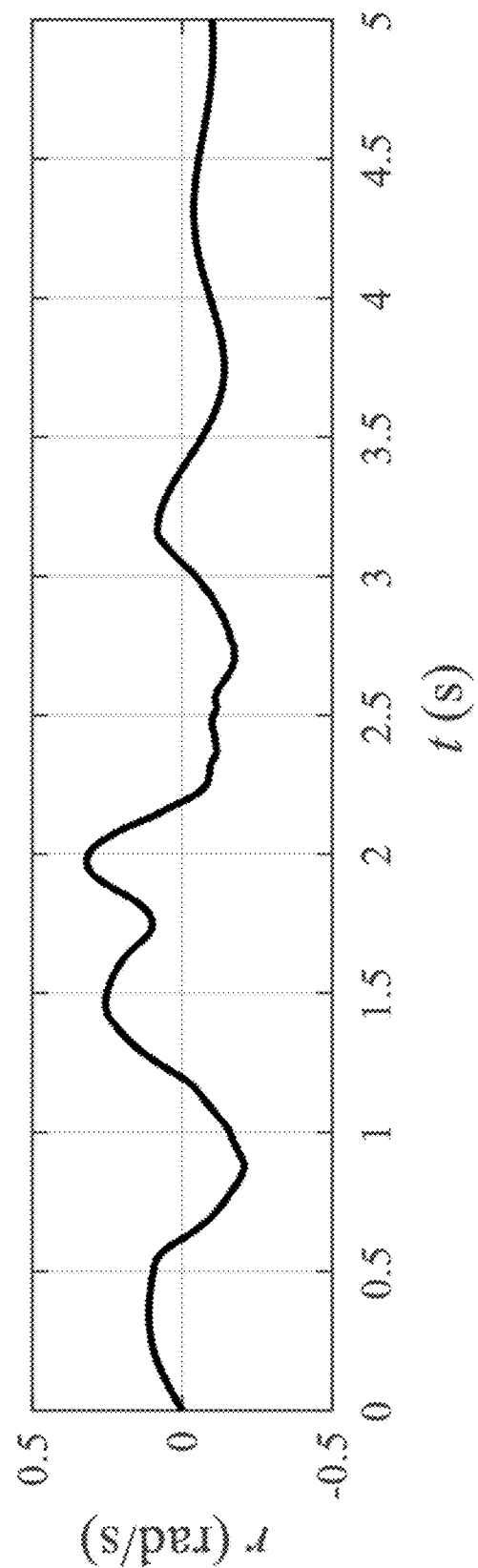
Figure 5A:
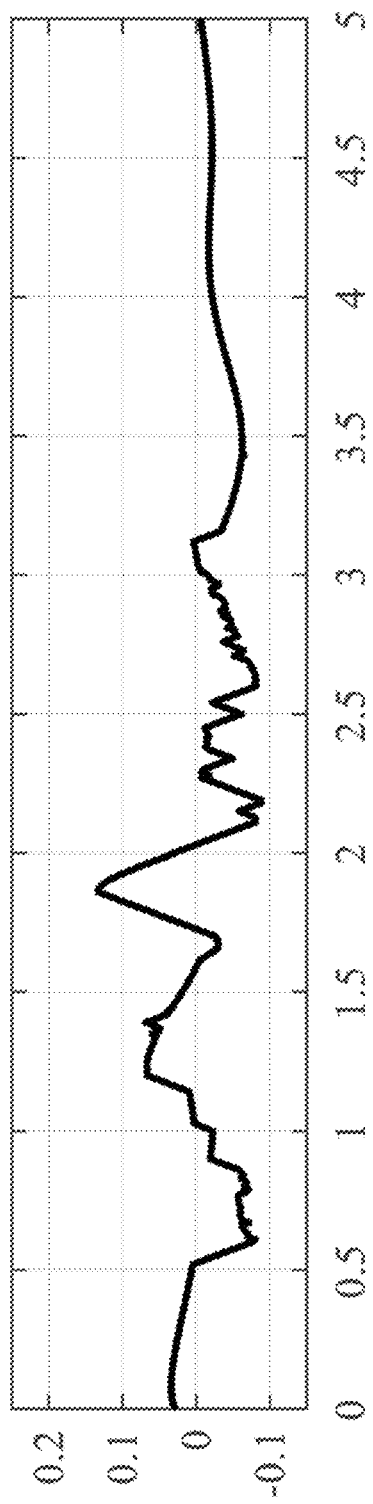
FIGS. 5A and 5B are a pair of graphical representations showing control inputs for CLF-TCBF-CDBF vehicle stability control described herein.
Figure 5B:
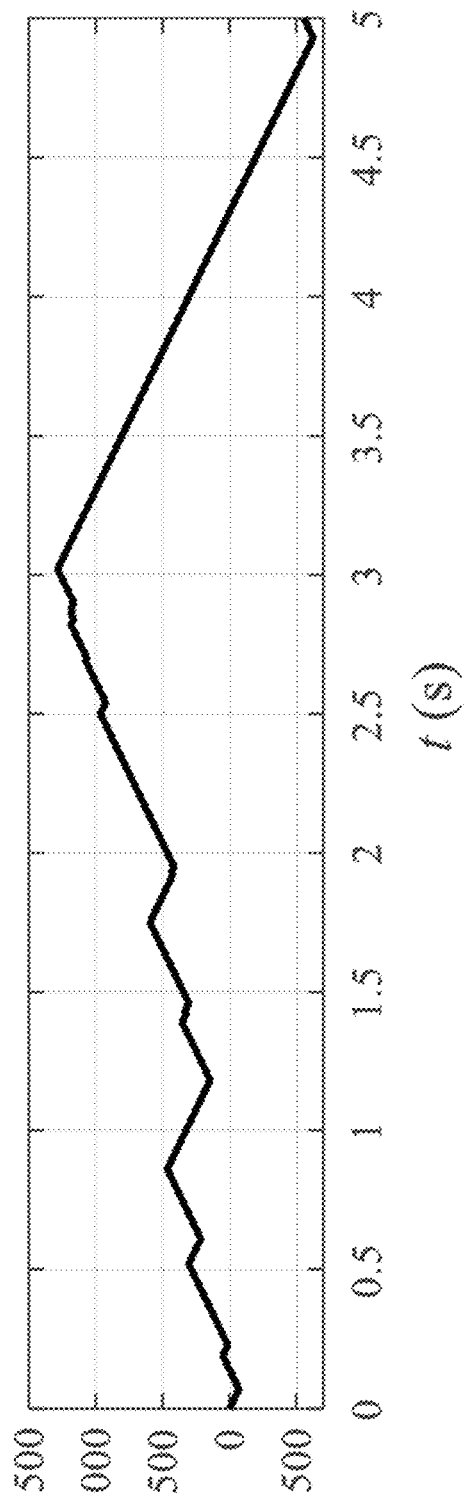

CLF-TCBF-CDBF corresponds with the functionality of the vehicle safety control system 160 shown in FIG. 1C. In this case, the control $\dot{u}$ is determined by the QP problem in (55) with the vehicle stability constraints in (56)-(58), and then the formal control u is calculated by integrating it. Involving all of the CLF, TCBF, and CDBF constraints in the QP problem, the AV is both dynamic stable and kinematic safe. As shown in FIG. 3, the AV completes the single lane change without violations of any safety constraints. The implementation of CDBF constraints makes the AV operate in a dynamic stable region (inferred by the small values shown in FIGS. 4A and 4B), which enables the well path tracking performance by simultaneously satisfying the TCBF constraints. The determined control inputs are shown in FIGS. 5A and 5B.

Case 2: CLF-TCBF-CBF

Figure 6:
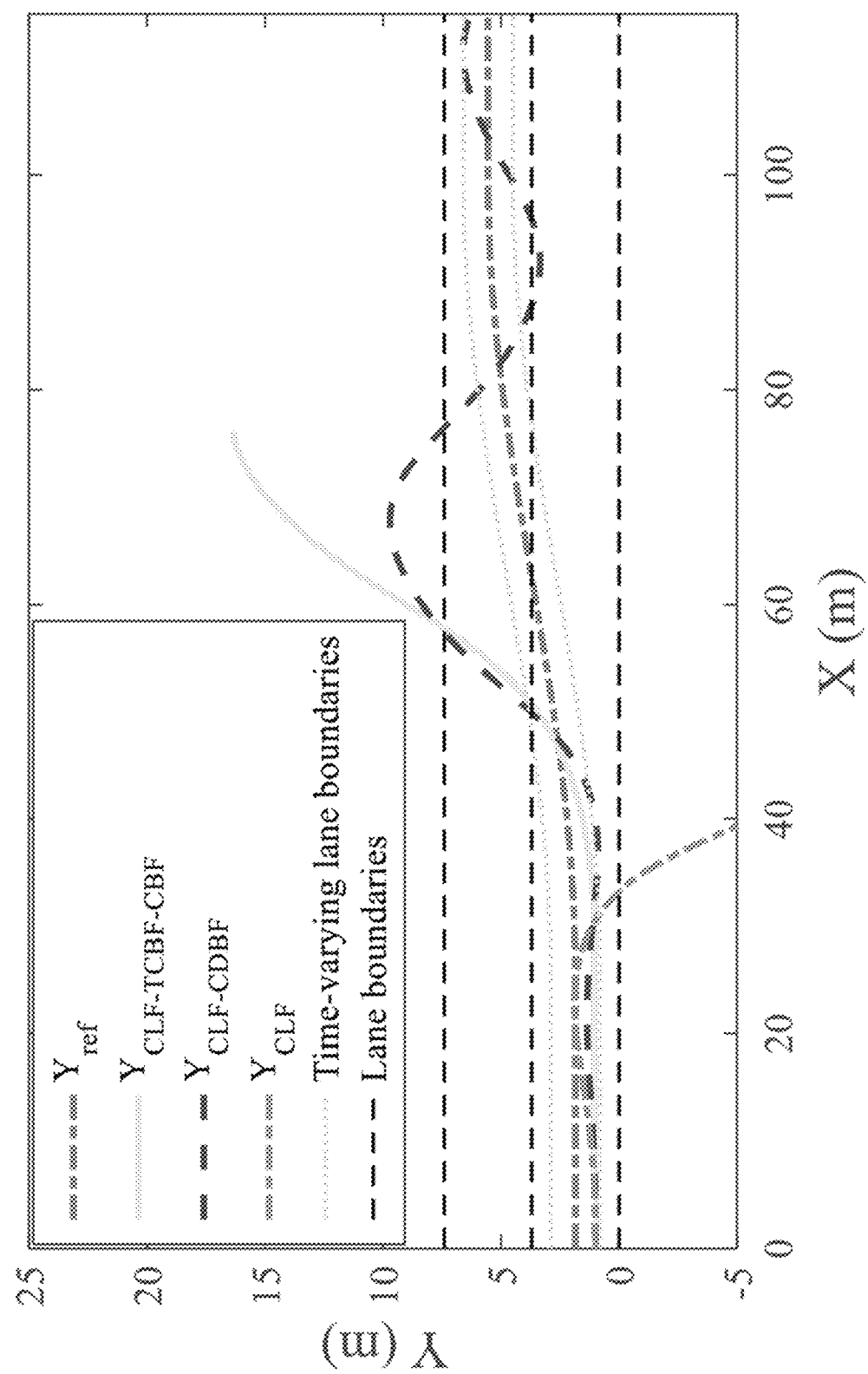
FIG. 6 is a graphical representation showing X-Y displacement results for CLF-TCBF-CBF and CLF-CDBF vehicle stability control.
Figure 7A:
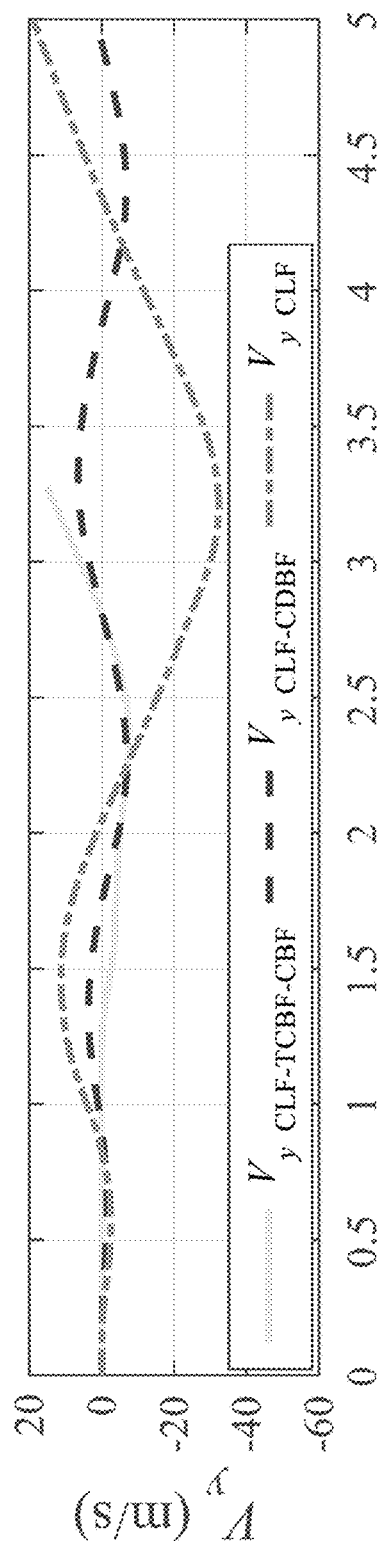
FIGS. 7A and 7B are a pair of graphical representations showing vehicle lateral stability results for CLF-TCBF-CBF and CLF-CDBF vehicle stability control.
Figure 7B:
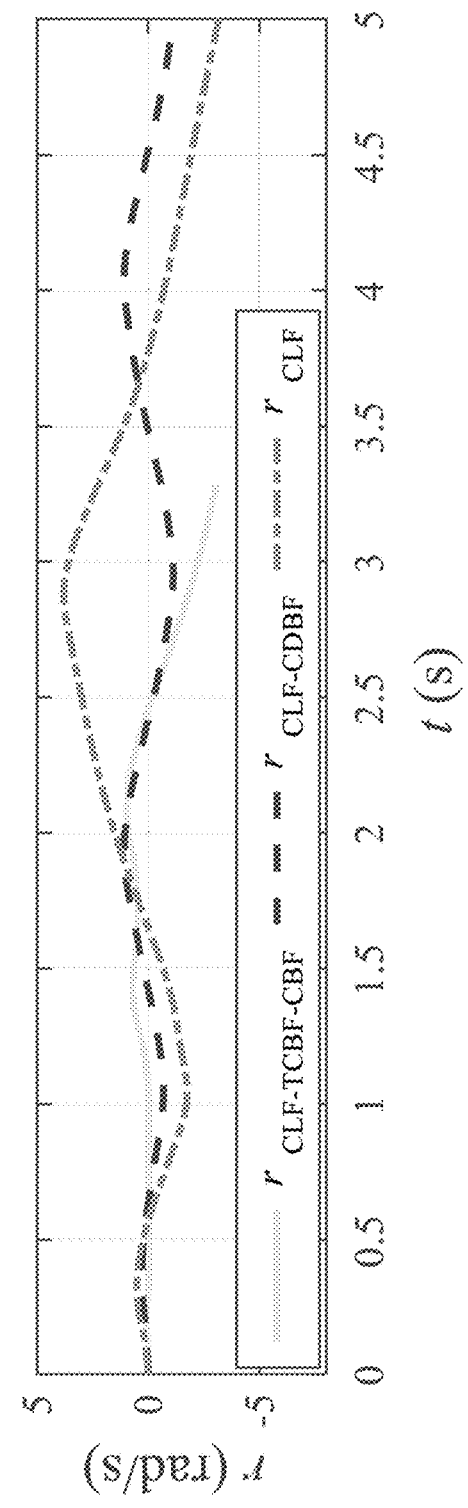
Figure 8A:
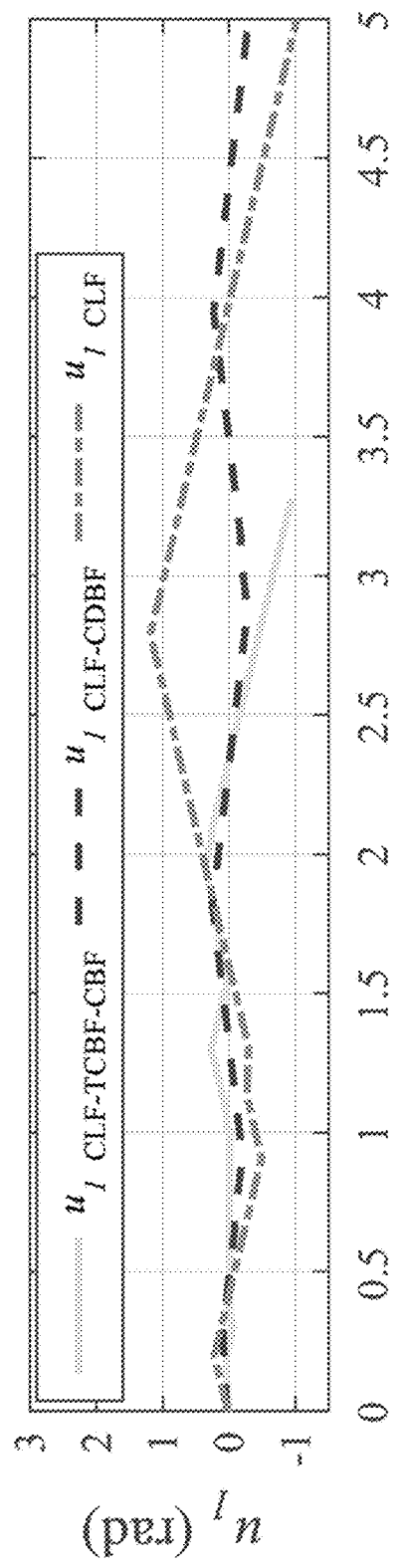
FIGS. 8A and 8B are a pair of graphical representations showing control inputs for CLF-TCBF-CBF and CLF-CDBF vehicle stability control.
Figure 8B:
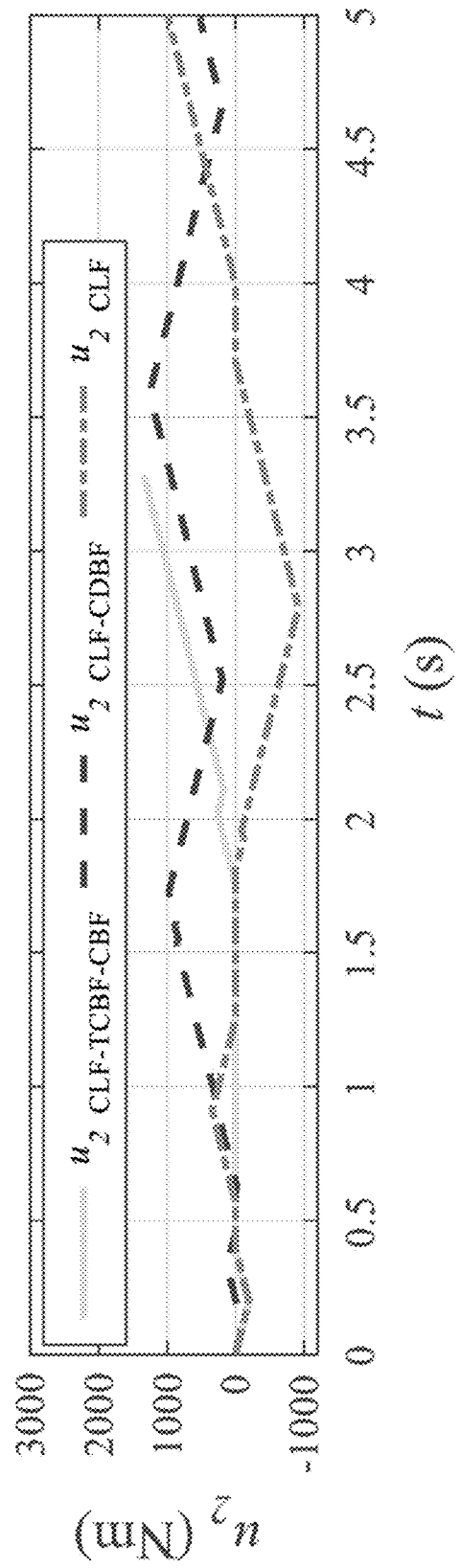

In this case, instead of using CDBF, CBF (59) is used along with TCBF (57) and CLF (58) to guarantee the vehicle stability with respect to a fixed stability region. Since the fixed stability region is not an accurate estimation of the vehicle lateral stability region, the corresponding CBF constraints cannot effectively guarantee the vehicle lateral stability. Therefore, even the TCBF and CLF constraints are applied, the vehicle safety and tracking performance cannot be achieved since the vehicle dynamic stability is not guaranteed, as shown in FIG. 6.

Case 3: CLF-CDBF

In this case, with the CDBF (56) and CLF (58) constraints, both vehicle dynamic stability and (asymptotically) path tracking performance are controlled. However, as shown in FIG. 6, the guaranteed vehicle dynamic stability cannot ensure kinematic safety, where the vehicle Y displacement exceeds the time-varying lane change constraint (even the road lane boundary). The vehicle states and control inputs are presented in FIGS. 7A and 7B and FIGS. 8A and 8B, respectively.

Case 4: Only CLF

In this case, only CLF (58) constraints are applied for the path tracking purpose. As shown in FIG. 6, due to the low road-tire friction coefficient, the vehicle lost the stability and the Y displacement is severely out of the lane boundaries. In addition, both vehicle lateral velocity and yaw rate shown in FIGS. 7A and 7B infer that the vehicle is severely unstable. This observation infers that the pure path tracking controller may not be able to ensure good tracking performance when vehicle stability is not guaranteed.

5. Conclusions

In the systems and methods outlined within the present disclosure, CDBF, TCBF, and CLF are incorporated together within a quadratic programming problem to solve the problem of safety-guaranteed driving control of AVs. The mismatch issue among different constraint forms in complicated and varying driving scenarios is addressed by adopting second-order versions of TCBF and CLF invariant constraints. A vehicle lateral stability control problem is formulated as one implementation of the vehicle safety control system using CDBF, TCBF, and CLF. The control design is validated by an emergent lane change maneuver through CarSime/Simulink co-simulations.

6. Methods

Figure 9:
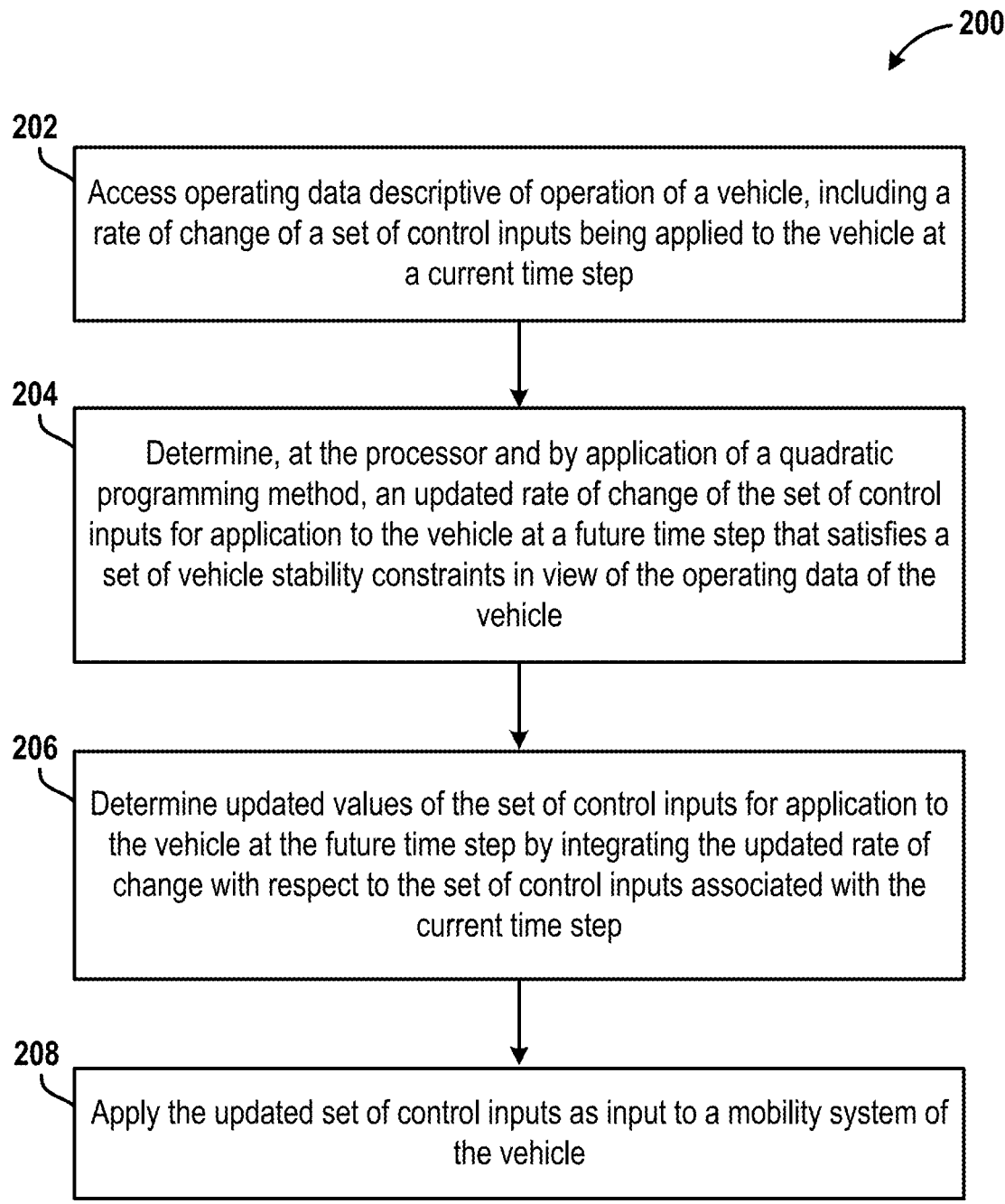
FIG. 9 is a process flow diagram showing a method for implementation of CLF-TCBF-CDBF vehicle stability control.

FIG. 9 illustrates a method 200 for updating a set of control inputs of a vehicle for vehicle lateral stability control.

Step 202 of method 200, a method includes accessing operating data descriptive of operation of a vehicle (e.g., vehicle 100 of FIG. 1B), including a rate of change ($\dot{u}$) of a set of control inputs (u) being applied to the vehicle at a current time step.

For the example implementation of vehicle safety control system 160 corresponding to an emergent lane change maneuver, the set of control inputs can include a front wheel steering angle value and a yaw moment value. The operating data can include a lateral velocity and a yaw rate of the vehicle, the lateral velocity and yaw rate being associated with a set of stability region boundary functions descriptive of a stability region of the vehicle. The operating data can also include perception data descriptive of a surrounding environment of the vehicle. The perception data can include a set of lane boundaries with respect to a global lateral displacement value of the vehicle and a set of heading angle boundaries with respect to a heading angle of the vehicle.

Step 204 of method 200 includes determining an updated rate of change of the set of control inputs for application to the vehicle at a future time step that satisfies a set of vehicle stability constraints in view of the operating data of the vehicle. Step 204 can be accomplished by application of a quadratic programming method ("QP") discussed with respect to sections 2 and 3 and equation (55) outlined herein.

The set of vehicle stability constraints can include a first constraint (e.g., second-order TCBF outlined in sections 2 and 3 and equation (56)) that enforces a time-varying control barrier function defining time-varying safety boundaries for operation of the vehicle, the time-varying control barrier function being a second-order time-varying control barrier function that incorporates the rate of change of the set of control inputs. For the example implementation corresponding to the emergent lane change maneuver, the time-varying safety boundaries of the first constraint ensure that the global lateral displacement value that results from the updated rate of change of the set of control inputs does not violate the set of lane boundaries. The time-varying safety boundaries of the first constraint can also ensure that the heading angle that results from the updated rate of change of the set of control inputs does not violate the set of heading angle boundaries.

The set of vehicle stability constraints can further include a second constraint (e.g., CBDF outlined in sections 2 and 3 and equation (58)) that enforces a control-dependent barrier function defining control-dependent safety boundaries for operation of the vehicle, the control-dependent barrier function incorporating the rate of change of the set of control inputs. For the example implementation corresponding to the emergent lane change maneuver, the control-dependent safety boundaries of the second constraint ensure that the yaw rate and the lateral velocity of the vehicle that result from the updated rate of change of the set of control inputs are within the stability region of the vehicle.

The set of vehicle stability constraints can further include a third constraint (e.g., second-order CLF outlined in sections 2 and 3 and equation (57)) that enforces a control Lyapunov function defining tracking control boundaries for operation of the vehicle, the control Lyapunov function being a second-order control Lyapunov function that incorporates the rate of change of the set of control inputs.

Step 206 of method 200 includes determining updated values of the set of control inputs for application to the vehicle at the future time step by integrating the updated rate of change with respect to the set of control inputs associated with the current time step. Step 208 of method can include applying the updated set of control inputs as input to a mobility system of the vehicle.

The functions performed in the processes and methods may be implemented in differing order. Furthermore, the outlined steps and operations are provided as examples, and some of the steps and operations may be optional, combined into fewer steps and operations, or expanded into additional steps and operations without detracting from the essence of the disclosed embodiments.

7. Computer-Implemented System

FIG. 10 is a schematic block diagram of an example device 300 that may be used with one or more embodiments described herein, e.g., as a component of the vehicle 100 of FIG. 1B, vehicle safety control system 160 of FIG. 1C and/or implementing aspects of method 200 of FIG. 9.

Device 300 comprises one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 include the mechanical, electrical, and signaling circuitry for communicating data over the communication links coupled to a communication network. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches). Memory 340 can include instructions executable by the processor 320 that, when executed by the processor 320, cause the processor 320 to implement aspects of the vehicle 100 and the method 200 outlined herein.

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may include vehicle stability processes/services 390, which can include aspects of method 200 and/or implementations of various modules described herein. Note that while vehicle stability processes/services 390 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the vehicle stability processes/services 390 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

The invention claimed is:

1. A system, comprising:
  a processor in communication with a memory, the memory including instructions executable by the processor to:
    access operating data descriptive of operation of a vehicle, including a rate of change of a set of control inputs being applied to the vehicle at a current time step;
    evaluate, at the processor and based on the operating data:
      a control Lyapunov function (CLF)-based constraint;
      a time-varying control barrier function (TCBF)-based constraint; and a control-dependent barrier function (CDBF)-based constraint;

construct, during operation of the vehicle and based on the operating data, a joint set of constraints that jointly reformulate the CLF-based constraint, the TCBF-based constraint, and the CDBF-based constraint as functions of a rate of change of the set of control inputs being applied to the vehicle;

determine updated values of the set of control inputs for application to the vehicle at a future time step based on the joint set of constraints; and apply the updated values of the set of control inputs as input to a mobility system of the vehicle.

2. The system of claim 1, the memory further including instructions executable by the processor to:

determine the updated values of the set of control inputs by application of a quadratic programming method that evaluates the joint set of constraints in view of the operating data of the vehicle.

3. The system of claim 1, the operating data including perception data descriptive of a surrounding environment of the vehicle, the perception data including a set of lane boundaries with respect to a global lateral displacement value of the vehicle and a set of heading angle boundaries with respect to a heading angle of the vehicle.

4. The system of claim 3, the TCBF-based constraint being dynamically evaluated based on an updated global lateral displacement value computed from a rate of change of the updated values of the set of control inputs, the TCBF-based constraint bounding the updated global lateral displacement value to comply with the set of lane boundaries.

5. The system of claim 3, the TCBF-based constraint being dynamically evaluated based on an updated heading angle computed from a rate of change of the updated values of the set of control inputs, the TCBF-based constraint bounding the updated heading angle to comply with the set of heading angle boundaries.

6. The system of claim 1, the operating data including a lateral velocity and a yaw rate of the vehicle, the lateral velocity and yaw rate being associated with a set of stability region boundary functions descriptive of a stability region of the vehicle.

7. The system of claim 6, the CDBF-based constraint being dynamically evaluated based on an updated yaw rate and an updated lateral velocity of the vehicle computed from a rate of change of the updated values of the set of control inputs, the CDBF-based constraint bounding the updated yaw rate and the updated lateral velocity of the vehicle to comply with the stability region of the vehicle.

8. The system of claim 1, the set of control inputs including a front wheel steering angle value and a yaw moment value.

9. The system of claim 1, the memory further including instructions executable by the processor to:

determine the updated values of the set of control inputs for application to the vehicle at the future time step by integrating the rate of change of the updated values of the set of control inputs with respect to the set of control inputs associated with the current time step.

10. A method, comprising:

accessing, at a processor in communication with a memory, operating data descriptive of operation of a vehicle, including a rate of change of a set of control inputs being applied to the vehicle at a current time step;

evaluating, at the processor and based on the operating data:

a control Lyapunov function (CLF)-based constraint;

a time-varying control barrier function (TCBF)-based constraint; and a control-dependent barrier function (CDBF)-based constraint;

constructing, during operation of the vehicle and based on the operating data, a joint set of constraints that jointly reformulate the CLF-based constraint, the TCBF-based constraint, and the CDBF-based constraint as functions of a rate of change of the set of control inputs being applied to the vehicle;

determining updated values of the set of control inputs for application to the vehicle at a future time step based on the joint set of constraints; and applying the updated values of the set of control inputs as input to a mobility system of the vehicle.

11. The method of claim 10, further comprising:

determine the updated values of the set of control inputs by application of a quadratic programming method that evaluates the joint set of constraints in view of the operating data of the vehicle.

12. The method of claim 10, further comprising:

determining the updated values of the set of control inputs for application to the vehicle at the future time step by integrating the rate of change of the updated values of the set of control inputs with respect to the set of control inputs associated with the current time step.

13. The method of claim 10, the operating data including perception data descriptive of a surrounding environment of the vehicle, the perception data including a set of lane boundaries with respect to a global lateral displacement value of the vehicle and a set of heading angle boundaries with respect to a heading angle of the vehicle.

14. The method of claim 13, the TCBF-based constraint being dynamically evaluated based on an updated global lateral displacement value computed from a rate of change of the updated values of the set of control inputs, the TCBF-based constraint bounding the updated global lateral displacement value to comply with the set of lane boundaries, and the TCBF-based constraint being dynamically evaluated based on an updated heading angle computed from a rate of change of the updated values of the set of control inputs, the TCBF-based constraint bounding the updated heading angle to comply with the set of heading angle boundaries.

15. The method of claim 10, the operating data including a lateral velocity and a yaw rate of the vehicle, the lateral velocity and yaw rate being associated with a set of stability region boundary functions descriptive of a stability region of the vehicle, and the set of control inputs including a front wheel steering angle value and a yaw moment value.

16. The method of claim 15, the CDBF-based constraint being dynamically evaluated based on an updated yaw rate and an updated lateral velocity of the vehicle computed from a rate of change of the updated values of the set of control inputs, the CDBF-based constraint bounding the updated yaw rate and the updated lateral velocity of the vehicle to comply with the stability region of the vehicle.

* * * * *